United States Patent
Yazdanfar et al.

(10) Patent No.: US 7,576,307 B2
(45) Date of Patent: Aug. 18, 2009

(54) MICROSCOPE WITH DUAL IMAGE SENSORS FOR RAPID AUTOFOCUSING

(75) Inventors: Siavash Yazdanfar, Niskayuna, NY (US); Robert John Filkins, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 36 days.

(21) Appl. No.: 11/741,839

(22) Filed: Apr. 30, 2007

(65) Prior Publication Data

US 2008/0266652 A1 Oct. 30, 2008

(51) Int. Cl.
*G02B 27/16* (2006.01)
*G02B 27/40* (2006.01)

(52) U.S. Cl. .............. 250/201.3; 250/201.2; 348/349; 348/350

(58) Field of Classification Search .............. 250/201.2, 250/201.3; 348/349, 350
See application file for complete search history.

(56) References Cited

U.S. PATENT DOCUMENTS

| | | | | |
|---|---|---|---|---|
| 3,883,689 | A * | 5/1975 | Mansour et al. ............. | 348/350 |
| 5,668,597 | A * | 9/1997 | Parulski et al. .............. | 348/350 |
| 5,790,710 | A |  8/1998 | Price et al. | |
| 6,172,349 | B1 |  1/2001 | Katz et al. | |
| 6,677,565 | B1 |  1/2004 | Wahl et al. | |
| 6,760,154 | B1 |  7/2004 | Focht | |
| 6,879,440 | B2 |  4/2005 | Cemic et al. | |
| 7,177,454 | B2 |  2/2007 | McLaren et al. | |
| 2001/0045989 | A1* | 11/2001 | Onuki ......................... | 348/345 |
| 2005/0109959 | A1 |  5/2005 | Wasserman et al. | |
| 2005/0121596 | A1 |  6/2005 | Kam et al. | |
| 2005/0258335 | A1* | 11/2005 | Oshiro et al. ............. | 250/201.3 |
| 2006/0044454 | A1* |  3/2006 | Kuwakino ................... | 348/350 |
| 2007/0188650 | A1* |  8/2007 | Kobayashi et al. .......... | 348/344 |

FOREIGN PATENT DOCUMENTS

| WO | WO 0043820 | 7/2000 |
|---|---|---|
| WO | WO2006024967 | 3/2006 |

OTHER PUBLICATIONS

PCT Search Report- Aug. 11, 2008.
Bravo-Zanoguera et al., High-Performance Autofocus Circuit for Biological Microscopy, Review of Scientific Instruments, vol. 69, No. 11, pp. 3966-3977, Nov. 1998.
Sun et al., "Autofocusing in Computer Microscopy: Selecting the Optimal Focus Algorithm", Microscopy Research and Technique, vol. 65, pp. 139-149, Oct. 2004.
Böcker, W. et al., "A Fast Autofocus Unit for Fluorescence Microscopy", Phys. Med. Biol., vol. 42, pp. 1981-1992, 1997.

\* cited by examiner

*Primary Examiner*—Stephen Yam
(74) *Attorney, Agent, or Firm*—Jason K. Klindtworth (57) ABSTRACT

A digital optical microscope includes a primary image sensor that generates a primary image of a sample at a primary frame rate, an auxiliary image sensor that generates an auxiliary image of the sample at an auxiliary frame rate that is faster than the primary frame rate, and a controller that adjusts a focal distance between an objective lens and the sample along an optical axis in response to the auxiliary image, thereby autofocusing the primary image on the sample. The primary image sensor generates the primary image in response to the autofocusing.

29 Claims, 8 Drawing Sheets

Field of view

— Primary Pixel
— Auxiliary Pixel

FIG.2C

Field of view

— Primary Pixel
— Auxiliary Pixel

MICROSCOPE WITH DUAL IMAGE SENSORS FOR RAPID AUTOFOCUSING

BACKGROUND

Embodiments of the present invention relate to microscopes, and more particularly to a digital optical microscope that autofocuses on a sample.

Digital optical microscopes are used to observe a wide variety of samples. Recently, a need has emerged to digitally record images of biological samples such as biopsy tissue on histopathologic slides for archiving, telepathology and rapid information retrieval. Although the samples are relatively thin, on the order of 5 microns, high power objective lenses with a numerical aperture greater than 0.5 typically have a depth of field that is even smaller. Furthermore, the sample, coverslip and slide may have variable thickness, the sample may grow or move, and the microscope may exhibit mechanical instability, scanning stage misalignment and thermal expansion.

Therefore, in order to keep the sample in focus (along the optical axis in the Z direction) as the microscope scans the sample and relocates the field of view to take snapshots of the sample at different lateral locations (in the XY focal plane), the microscope needs to autofocus on the sample to keep the objective lens within a suitable focal distance of the sample to generate high quality images.

Rapid autofocusing is important in automated biological and biomedical applications such as high-throughput pharmaceutical screening and large-scale autonomous microrobotic cell manipulation. Rapid autofocusing is also important in other applications such as integrated circuit chip inspection and microassembly of hybrid microelectromechanical systems (MEMS). Thus, rapid autofocusing is highly desirable in real-time image acquisition applications that cannot afford considerable time delays to adjust the focal distance between snapshots of the sample.

Conventional microscopes perform autofocusing by directing a laser beam at the sample, measuring a reflection of the laser beam off the sample to provide a single reference point, and using a feedback loop to adjust the focal distance. Although this approach provides rapid autofocusing, the single reference point may lack sufficient information for accurate autofocusing.

Conventional microscopes also perform autofocusing by obtaining multiple images at multiple focal distances, determining a quantitative characteristic for each image, determining an optimal focal distance based on the quantitative characteristic and using a feedback loop to adjust the focal distance. Although this approach provides accurate autofocusing, acquiring the multiple images may create time delays that prevent rapid autofocusing.

Therefore, there is a need for a microscope that performs accurate rapid autofocusing.

BRIEF DESCRIPTION

In one embodiment of the present invention a digital optical microscope includes a primary image sensor that generates a primary image of a sample at a primary frame rate, an auxiliary image sensor that generates an auxiliary image of the sample at an auxiliary frame rate that is faster than the primary frame rate, and a controller that adjusts a focal distance between an objective lens and the sample along an optical axis in response to the auxiliary image, thereby autofocusing the primary image on the sample. The primary image sensor generates the primary image in response to the autofocusing.

In accordance with another embodiment, a digital optical microscope includes an objective lens, a beam splitter that splits light that is collected from a sample and passes through the objective lens into a primary light path and an auxiliary light path, a primary image sensor that generates a primary image of the sample with a primary pixel count at a primary frame rate using the primary light path without using the auxiliary light path, an auxiliary image sensor that generates an auxiliary image of the sample with an auxiliary pixel count at an auxiliary frame rate using the auxiliary light path without using the primary light path, and a controller that adjusts a focal distance between the objective lens and the sample along an optical axis using the auxiliary image without using the primary image, thereby autofocusing the primary image on the sample using the auxiliary image sensor without using the primary image sensor. The primary image sensor generates the primary image in response to the autofocusing, the auxiliary pixel count is lower than the primary pixel count and the auxiliary frame rate is faster than the primary frame rate.

In accordance with a further embodiment, a digital optical microscope includes an objective lens with a field of view, a beam splitter that splits light that is collected from a sample at the field of view and passes through the objective lens into a primary light path and an auxiliary light path, a primary image sensor, an auxiliary image sensor and a controller. The primary image sensor generates first and second primary images of the sample using the primary light path without using the auxiliary light path, wherein the primary images each have a primary pixel count and are generated at a primary frame rate, the first primary image represents a first region of the sample at the field of view, the second primary image represents a second region of the sample at the field of view, and the regions are laterally offset. The auxiliary image sensor generates first, second and third auxiliary images of the sample using the auxiliary light path without using the primary light path, wherein the auxiliary images are generated while the field of view is at the second region and the auxiliary images each have an auxiliary pixel count and are generated at an auxiliary frame rate. The controller adjusts a lateral position between the objective lens and the sample to move the field of view from the first region to the second region and adjusts a focal distance between the objective lens and the sample along an optical axis to a selected focal distance using the auxiliary images without using the primary images, thereby autofocusing the second primary image on the sample using the auxiliary image sensor without using the primary image sensor, wherein the primary image sensor generates the first primary image while the controller moves the field of view from the first region to the second region, while the auxiliary image sensor generates the auxiliary images and while the controller adjusts the focal distance to the selected focal distance, the primary image sensor generates the second primary image in response to the autofocusing, the auxiliary pixel count is lower than the primary pixel count and the auxiliary frame rate is faster than the primary frame rate.

DRAWINGS

The following detailed description can be best understood when the read with reference to the accompanying drawings in which like characters represent like parts throughout the drawings, wherein.

DETAILED DESCRIPTION

Figure 1:
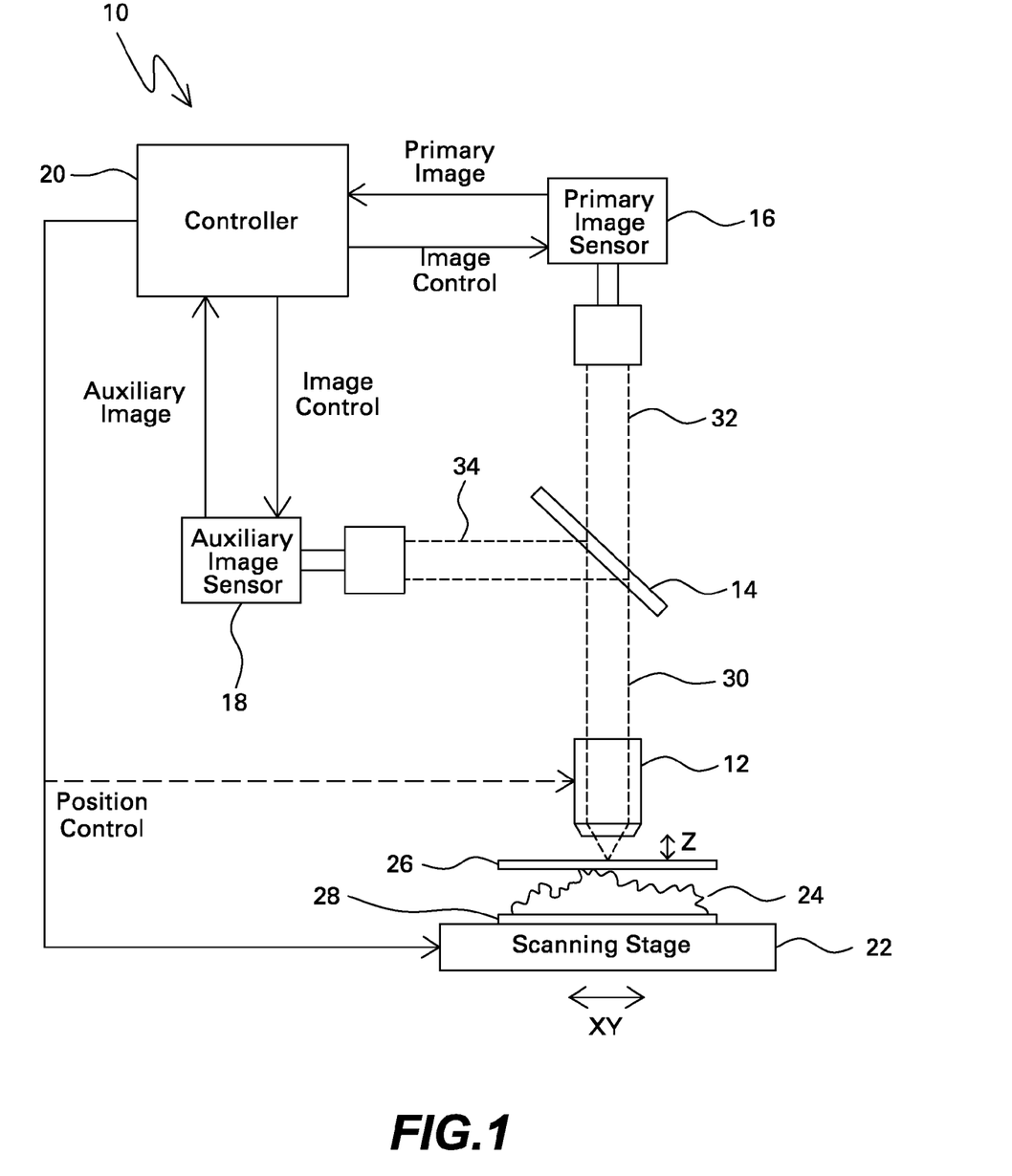
FIG. 1 shows one embodiment of a digital optical microscope that includes an objective lens, a primary image sensor and an auxiliary image sensor in accordance with one embodiment.

FIG. 1 illustrates one embodiment of a digital optical microscope 10 that includes objective lens 12, beam splitter 14, primary image sensor 16, auxiliary image sensor 18, controller 20 and scanning stage 22.

Sample 24 is disposed between coverslip 26 and slide 28, and sample 24, coverslip 26 and slide 28 are supported by scanning stage 22. Coverslip 26 and slide 28 may be transparent glass, while sample 24 may represent a wide variety of objects or samples including biological samples. For example, sample 24 may represent biopsy tissue such as liver or kidney cells. In a non-limiting example, such biopsy tissue samples may have a thickness that averages 5 microns and varies by several microns and may have a lateral surface area of approximately 15×15 millimeters, and.

Objective lens 12 is spaced from sample 24 by a focal distance that extends along an optical axis in the Z (vertical) direction, and objective lens 12 has a focal plane in the XY (lateral) directions. Objective lens 12 collects light 30 from sample 24 at a field of view, magnifies light 30 and directs light 30 to beam splitter 14. Thus, light 30 radiates from sample 24, passes through objective lens 22 and strikes beam splitter 14. In one embodiment, objective lens 22 may be a high power objective lens with 20× magnification and a 0.5 numerical aperture (small depth of focus). Objective lens 22 may be spaced from sample 24 by a focal distance of a few millimeters (long working distance) and may collect light 30 from a field of view of 750×750 microns in the focal plane. However, the working distance, field of view and focal plane may vary depending upon the microscope configuration or characteristics of the sample to be imaged.

Digital optical microscope 10 can generate light 30 from sample 24 using a wide variety of imaging modes including brightfield, phase contrast, differential interference contrast and fluorescence. Thus, light 30 can be transmitted or reflected from sample 24 using brightfield, phase contrast or differential interference contrast, or light 30 can be emitted from sample 24 (fluorescently labeled or intrinsic) using fluorescence. Furthermore, light 30 can be generated using transillumination (where the light source and objective lens 12 are on opposite sides of sample 24) or epi-illumination (where the light source and objective lens 12 are on the same side of sample 24). As such, digital optical microscope 10 may further include a light source (such as a high intensity LED or a mercury or xenon arc or metal halide lamp) which has been omitted from the figures for convenience of illustration.

Beam splitter 14 splits light 30 into primary light path 32 and auxiliary light path 34. Primary light path 32 is directed to primary image sensor 16, and auxiliary light path 34 is directed to auxiliary image sensor 18. In one embodiment, beam splitter 14 may be a partial reflection filter (or partially transparent mirror) that transmits one half of light 30 to primary light path 32 and reflects the other half of light 30 to auxiliary light path 34 when brightfield imaging is used. In one embodiment, beam splitter 14 may be a wavelength discrimination filter (or dichroic mirror) that transmits visible light that includes the fluorescent excitation wavelength to primary light path 32 and reflects infrared light that excludes the fluorescent excitation wavelength to auxiliary light path 34 when fluorescent imaging is used.

In one embodiment, primary image sensor 16 may generate a primary image of sample 24 at the field of view using primary light path 32 without using auxiliary light path 34, and auxiliary image sensor 18 generates an auxiliary image of sample 24 at the field of view, or at a region or regions of interest within the field of view, using auxiliary light path 34 without using primary light path 32. In one embodiment, primary image sensor 16 generates the primary image with a primary pixel count at a primary frame rate, and auxiliary sensor 18 generates the auxiliary image with an auxiliary pixel count at an auxiliary frame rate. In one embodiment, the auxiliary pixel count is substantially lower than the primary pixel count, and as a result, the auxiliary frame rate is substantially faster than the primary frame rate.

Primary image sensor 16 and auxiliary image sensor 18 may be commercially available CCD digital cameras. In one embodiment, the primary pixel count is at least three times as large as the auxiliary pixel count, and the auxiliary frame rate is at least three times as fast as the primary frame rate. In one embodiment, the primary pixel count is at least ten times as large as the auxiliary pixel count, and the auxiliary frame rate is at least ten times as fast as the primary frame rate.

In one embodiment, controller 20 adjusts the focal distance between objective lens 12 and sample 24 to an optimal focal distance in response to multiple auxiliary images obtained at multiple focal distances, thereby providing the technical effect of autofocusing the primary image on sample 24. Controller 20 may perform the autofocusing using auxiliary image sensor 18 and the auxiliary images without using primary image sensor 16 or a primary image, and may then instruct primary image sensor 16 to generate the primary image in response to the autofocusing.

Controller 20 may instruct scanning stage 22 to laterally shift in the XY plane so that the field of view laterally shifts to a region of sample 24. Thereafter, controller 20 may vertically shift objective lens 12 relative to sample 24 in the Z direction to obtain multiple auxiliary images at successive focal distances while scanning stage 22 remains at a fixed lateral position. For example, controller 20 may vertically shift objective lens 12 (as depicted by the broken position control arrow) while scanning stage 22 and sample 24 remain at a fixed vertical position. Alternatively, controller 20 may vertically shift scanning stage 22 and sample 24 (as depicted by the solid position control arrow) while objective lens 12 remains at a fixed vertical position.

In one embodiment, controller 20 determines the image quality of the multiple auxiliary images using a focus algorithm. The focus algorithm may calculate a quantitative characteristic (or figure of merit) for the auxiliary image based on the sharpness of the auxiliary image. Furthermore, the quantitative characteristic may have a maximum value at the optimal focal distance and decreasing value as the focus decreases, or alternatively, a minimum value at the optimal focal distance and increasing value as the focus decreases. Focus algorithms are widely discussed in the literature. Derivative-based focus algorithms assume that well-focused images have more high-frequency content than defocused images. Statistics-based focus algorithms distinguish focused images from defocused images using variance and correlation. Histogram-based focus algorithms use histograms (the number of pixels with a given intensity in an image) to analyze the distribution and frequency of image intensities. Intuitive focus algorithms sum the pixel intensities above a threshold. Thus, the quantitative characteristic can be based on a variety of image characteristics including contrast, entropy, variance, spatial frequency content, autocorrelation and total image intensity. Furthermore, the best focus algorithm may depend on the imaging mode. For instance, normalized variance may provide the best overall performance for brightfield, phase contrast and differential interference contrast, whereas autocorrelation may provide the best overall performance for fluorescence. See Sun et al., "Autofocusing in Computer Microscopy: Selecting the Optimal Focus Algorithm," Microscopy Research and Technique, 65:139-149 (2004) which is incorporated by reference. Likewise, the derivative-based Brenner gradient focus algorithm computes a first difference between a pixel and its neighbor with a horizontal/vertical distance of two and is well-suited for transmitted brightfield.

In one embodiment, controller 20 determines the optimal focal distance based on the focus values of the quantitative characteristic for the multiple auxiliary images. For example, controller 20 can select the optimal focal distance based on the maximum focus value, or interpolation using the focus values, or a curve fit using the focus values.

In one embodiment, controller 20 vertically shifts objective lens 12 relative to sample 24 in the Z direction to the optimal focal distance while scanning stage 22 remains at a fixed lateral position. For example, controller 20 may vertically shift objective lens 12 (as depicted by the broken position control arrow) while scanning stage 22 and sample 24 remain at a fixed vertical position, or alternatively, controller 20 may vertically shift scanning stage 22 and sample 24 (as depicted by the solid position control arrow) while objective lens 12 remains at a fixed vertical position. Thereafter, controller 20 may instruct primary image sensor 16 to generate the primary image while objective lens 12 and sample 24 are separated by the optimal focal distance and scanning stage 22 remains at a fixed lateral position. The primary image is a snapshot of sample 24 at the field of view. In one embodiment, the described autofocusing mechanism may occur during continuous motion of scanning stage 22.

In one embodiment, controller 20 continues the scanning operation by laterally shifting the field of view to another region of sample 24, obtaining multiple auxiliary images at multiple focal distances, determining the optimal focal distance, adjusting objective lens 12 relative to sample 24 to the optimal focal distance, thereby providing the technical effect of autofocusing the primary image on sample 24, and then instructing primary image sensor 16 to generate the primary image. In an example where objective lens 12 has a field of view of 750×750 microns and sample 24 has a lateral surface area of 15×15 millimeters, primary image sensor 16 may generate roughly 400 primary images as the field of view traverses sample 24.

Controller 20 can implement the autofocusing operation using various combinations of hardware and software. Frame grabber cards and related autofocus circuits are widely discussed in the literature. See, for instance, Bravo-Zanoguera, "High-Performance Autofocus Circuit for Biological Microscopy", Review of Scientific Instruments, Volume 69, Number 11 (November, 1998) which is incorporated by reference. In order to increase the execution speed of the focus algorithm, controller 20 may execute dedicated firmware or low-level software such as C++ rather than high-level software such as MATLAB®.

Controller 20 can be implemented by a wide variety of platforms. For example, controller 20 can be a dedicated system located within the housing for objective lens 12, beam splitter 14, primary image sensor 16, auxiliary image sensor 18 and scanning stage 22. As another example, controller 20 can be an external computer (such as a general-purpose personal computer) located outside the housing that may include a keyboard, a mouse, a monitor and a frame grabber card and is electrically connected to primary image sensor 16, auxiliary image sensor 18 and scanning stage 22 by cables or wirelessly.

FIGS. 2A-2F show various relationships between the primary image and the auxiliary image. The primary image contains primary pixels depicted by thin borders, and the auxiliary image contains auxiliary pixels depicted by thick borders. The primary pixels are superimposed on the auxiliary pixels within the field of view to facilitate comparison. The primary pixels have uniform shape and size and the primary pixel borders are covered yet apparent where overlapped by the auxiliary pixel borders. In the illustrated embodiments, the primary image has a higher pixel count than the auxiliary image, and therefore the primary pixels outnumber the auxiliary pixels in the field of view.

Figure 2A:
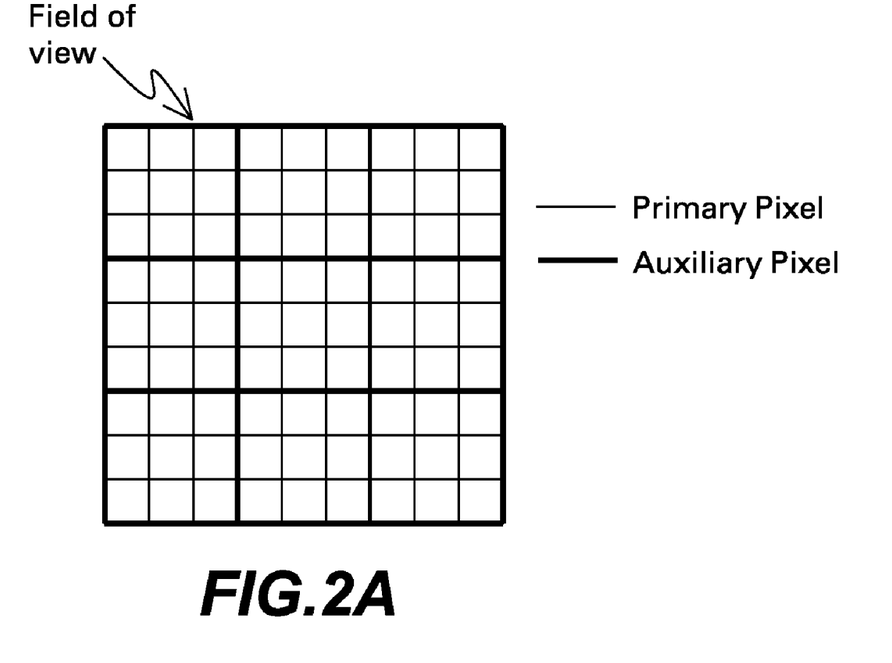
FIGS. 2A-2F show various relationships between the primary image and the auxiliary image.

In FIG. 2A, the primary image and the auxiliary image occupy the field of view. However, the primary pixels are smaller than the auxiliary pixels. For example, the primary image may contain about 6.3 megapixels (2048×3072 pixels) whereas the auxiliary image may contain about 1.5 megapixels (1024×1536 pixels). In this example, the auxiliary camera operates at nearly four times the rate of the primary camera.

Figure 2B:
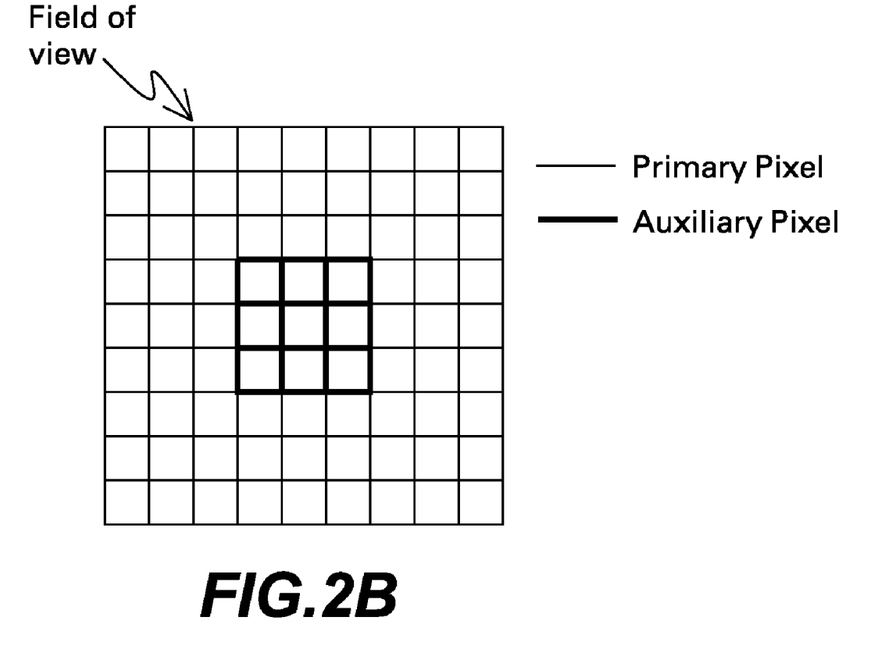

In FIG. 2B, the primary image occupies the field of view and the primary pixels are the same size as the auxiliary pixels. However, the auxiliary image occupies a centrally located region of interest within the field of view. For example, the primary image may contain about 6.3 megapixels (2048×3072 pixels) whereas the auxiliary image may contain about 307 kilopixels (640×480 pixels). In this example, the auxiliary camera operates at nearly 20 times the frame rate of the primary camera.

Figure 2C:
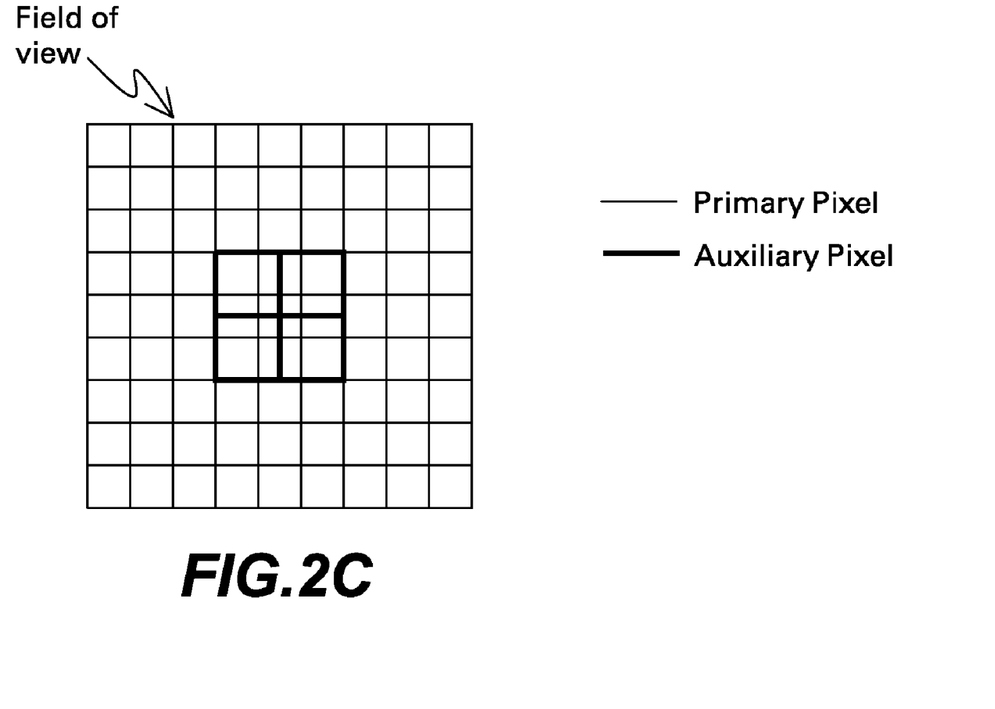

In FIG. 2C, the primary image occupies the field of view. However, the auxiliary image occupies a centrally located region of interest within the field of view and the primary pixels are smaller than the auxiliary pixels. For example, the primary image may contain about 6.3 megapixels (2048×3072 pixels) whereas the auxiliary image may contain about 307 kilopixels (640×480 pixels).

Figure 2D:
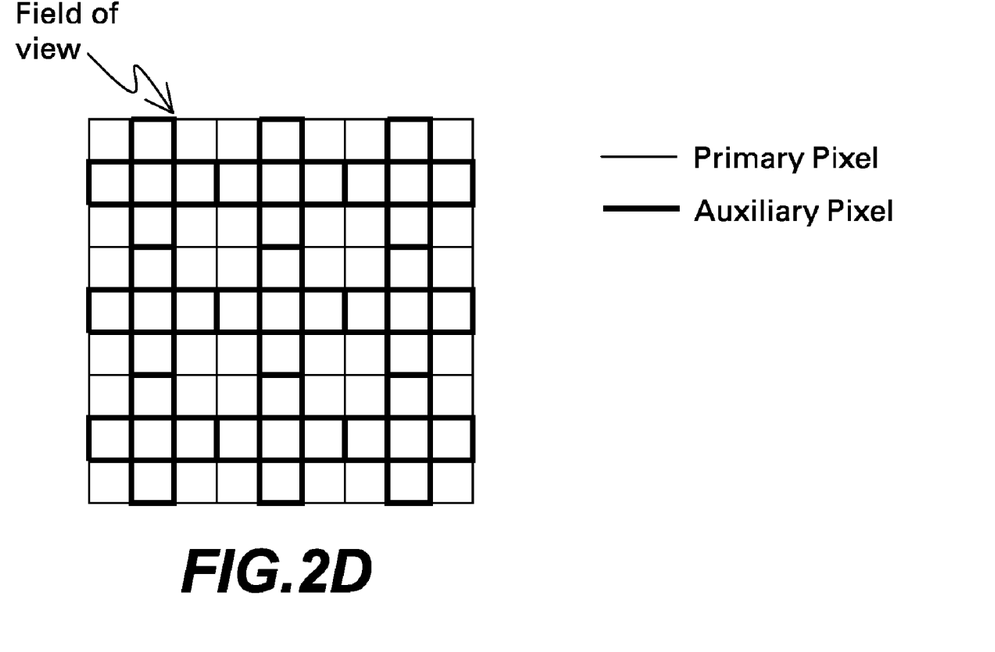

In FIG. 2D, the primary image occupies the field of view and the primary pixels are the same size as the auxiliary pixels. However, the auxiliary image occupies a grid pattern region of interest within the field of view. For example, the primary image may contain about 6.3 megapixels (2048×3072 pixels) whereas the auxiliary image may contain about 15 kilopixels (3 rows of 3072 pixels and 3 columns of 2048 pixels). In this example, the auxiliary camera operates at nearly 400 times the frame rate of the primary camera.

Figure 2E:
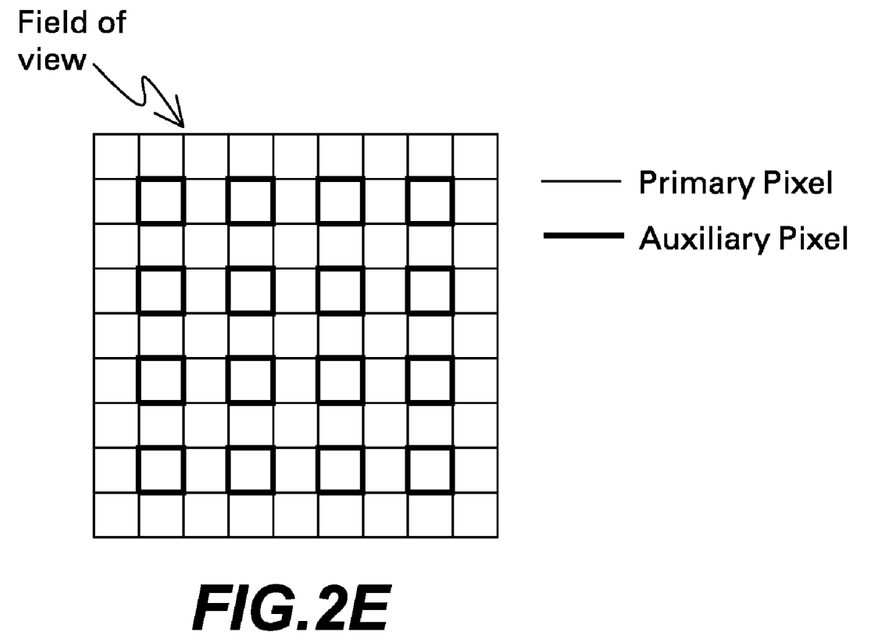

In FIG. 2E, the primary image occupies the field of view and the primary pixels are the same size as the auxiliary pixels. However, the auxiliary image occupies a checkerboard pattern in which each auxiliary pixel is spaced from its neighbors and constitutes a region of interest within the field of view. For example, the primary image may contain about 6.3 megapixels (2048×3072 pixels), whereas the auxiliary image may contain about 15 kilopixels (uniformly distributed throughout the field of view). In this example, the auxiliary frame rate is about 400 times the frame rate of the primary camera.

Figure 2F:
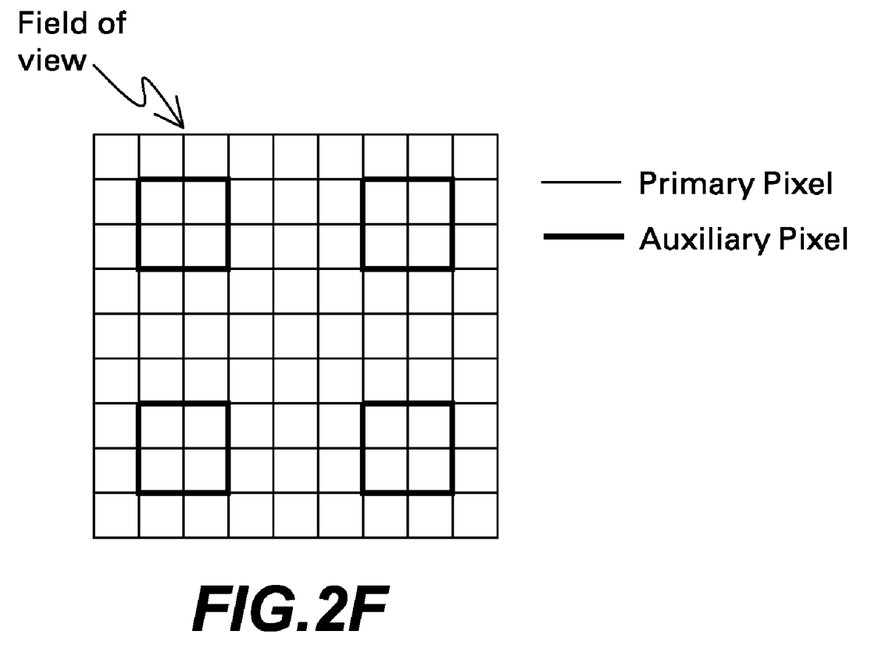

In FIG. 2F, the primary image occupies the field of view. However, the auxiliary image occupies a checkerboard pattern in which each auxiliary pixel is spaced from its neighbors and constitutes a region of interest within the field of view. Furthermore, the primary pixels are smaller than the auxiliary pixels. For example, the primary image may contain about 6.3 megapixels (2048×3072 pixels), whereas the auxiliary image may contain about 15 kilopixels (uniformly distributed throughout the field of view). In this example, the auxiliary frame rate is about 400 times as fast as the primary frame rate.

In one embodiment, primary image sensor 16 can have higher resolution than auxiliary image sensor 18 so that the primary pixels are smaller than the auxiliary pixels. For example, primary image sensor 16 may be a CCD digital camera with 4 megapixels and auxiliary image sensor 18 may be a CCD digital camera with 600 kilopixels. In an alternative embodiment, primary image sensor 16 can have the same resolution as auxiliary image sensor 18, and auxiliary image sensor 18 can generate the auxiliary image as only a region or regions of interest within the field of view. For example, a diffractive lens disposed in auxiliary light path 34 may apodize the light and transmit only a centrally located region of interest within the field of view to auxiliary image sensor 18. In another embodiment, the auxiliary image sensor 18 may observe a smaller field of view than the primary image sensor 16. As another example, the auxiliary image may contain only subsampled pixels such as every $N^{th}$ pixel, one or more rows, one or more columns, a grid pattern or a checkerboard pattern within the field of view.

Consequently, the auxiliary frame rate is faster than the primary frame rate. For example, the auxiliary frame rate may be on the order of hundreds of frames per second, and the primary frame rate may be on the order of tens of frames per second.

Figure 3:
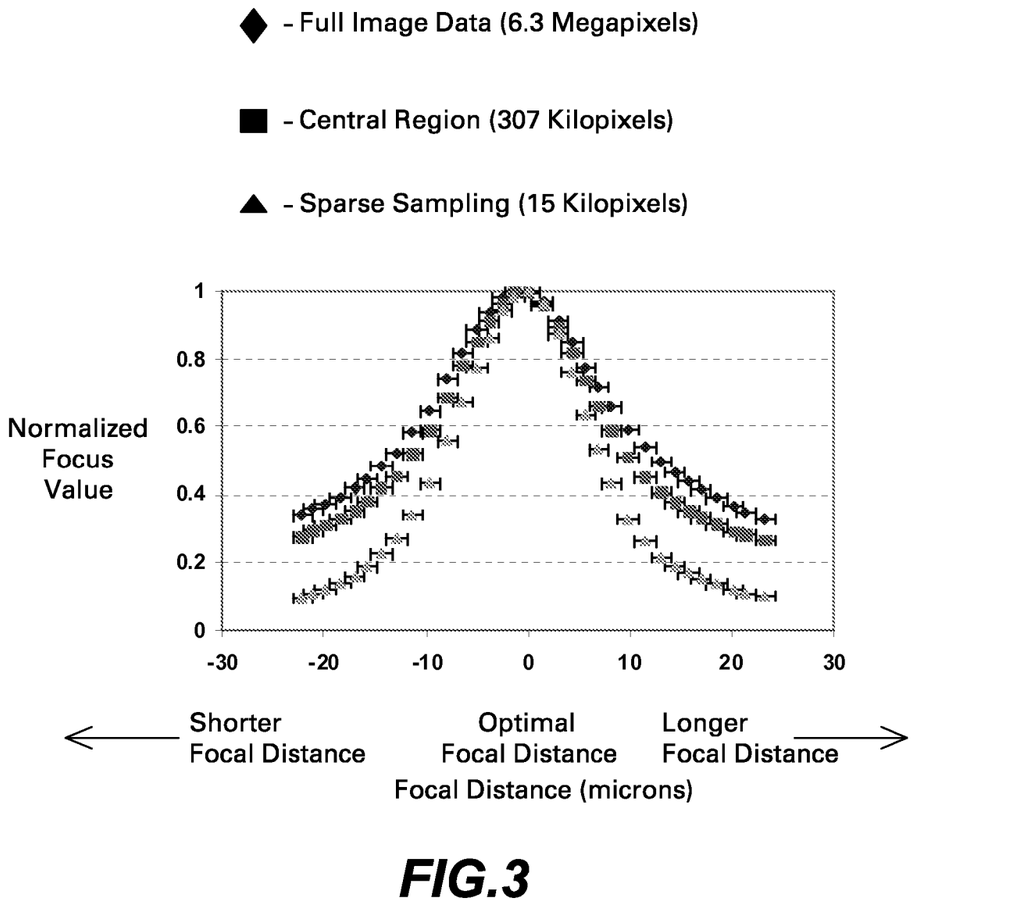
FIG. 3 shows normalized focus curves for various image data sets.

FIG. 3 shows normalized focus curves for various image data sets. The focus curves use variance as the quantitative characteristic and show a normalized focus value as a function of focal distance.

In this example, the focus curve for the full image data depicts the primary image that occupies the entire field of view and contains about 6.3 megapixels (2048×3072 pixels) as described in FIGS. 2A-2F. The focus curve for the central region depicts the auxiliary image that occupies a centrally located region of interest within the field of view and contains about 307 kilopixels (640×480 pixels) where the primary and auxiliary pixels have the same size as described in FIG. 2B. The focus curve for the sparse sampling depicts the auxiliary image that occupies a grid pattern region of interest within the field of view and contains about 15 kilopixels (3 rows of 3072 pixels and 3 columns of 2048 pixels) where the primary and auxiliary pixels have the same size as described in FIG. 2D.

The focus curves for not only the full image data, but also the central region and the sparse sampling, are unimodal symmetric Gaussian curves that exhibit distinct peaks near focus. As a result, the auxiliary images based on the central region and the sparse sampling provide robust, reliable focus values for determining the optimal focal distance.

Figure 4:
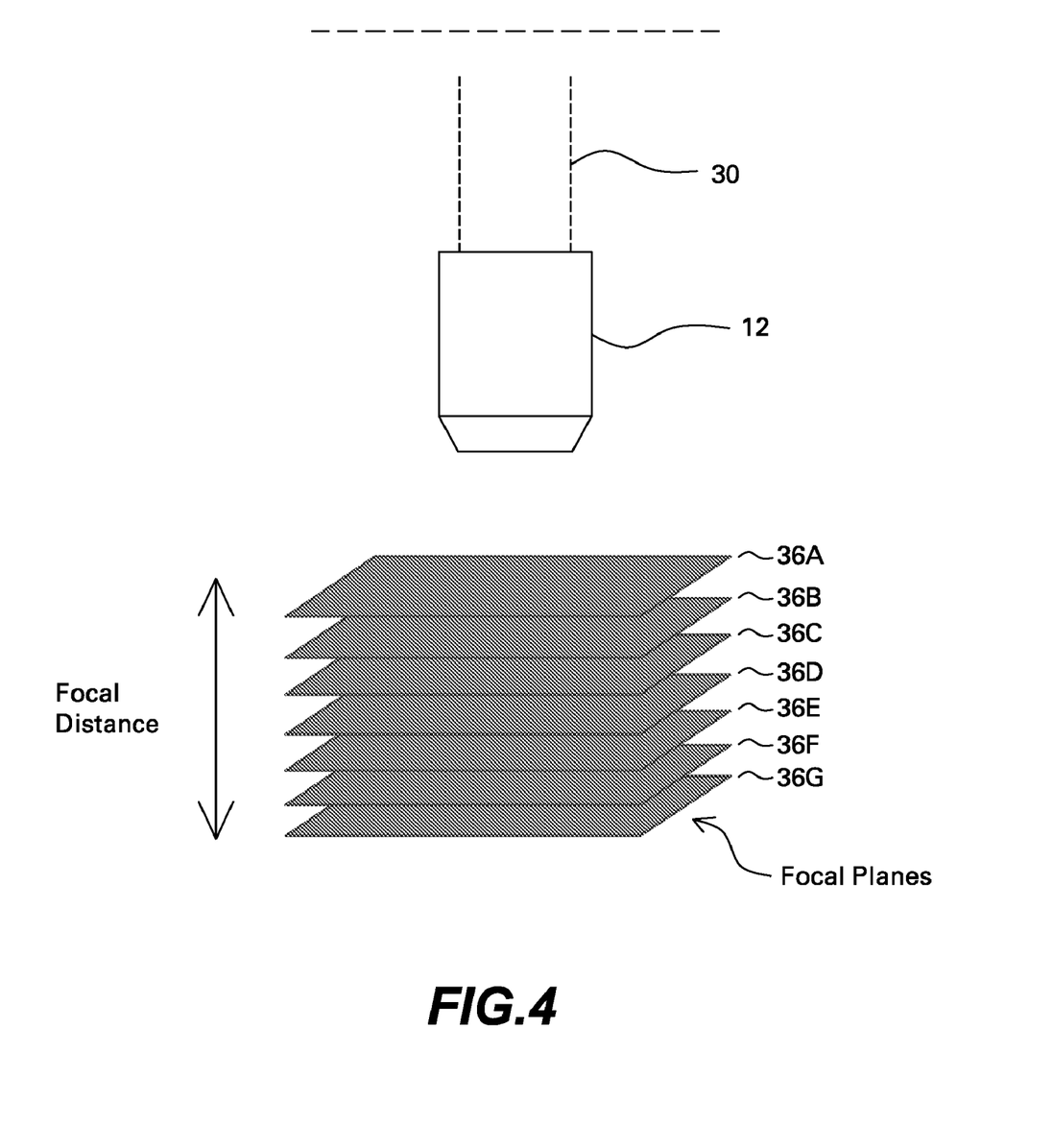
FIG. 4 shows the objective lens positioned at multiple focal distances to obtain multiple auxiliary images in multiple focal planes in accordance with one embodiment.

FIG. 4 shows objective lens 12 positioned at multiple focal distances to obtain multiple auxiliary images of sample 24 in multiple focal planes during the autofocusing operation. In the illustrated embodiment, focal planes 36A-36G are shown and are located at successive focal distances as depicted by the Z direction in FIG. 1 and the X axis in FIG. 3. In FIG. 4 focal planes 36A-36G span the operative focal range of objective lens 12. Accordingly, controller 20 can step objective lens 12 through focal planes 36A-36G in a wide variety of sequences to determine the focus values for the auxiliary images to select the optimal focal distance for the primary image. It should be noted that the number of focal planes utilized is not limited to those shown in FIG. 4.

In one embodiment, controller 20 can unidirectionally and incrementally decrease the focal distance so that objective lens 12 sequentially steps through the various focal planes. In the example illustrated in FIG. 4, the first auxiliary image may be generated at focal plane 36A, the second auxiliary image may be generated at focal plane 36B, and so on, until the final auxiliary image is generated at focal plane 36G. Likewise, controller 20 can unidirectionally and incrementally increase the focal distance so that objective lens 12 sequentially steps through the focal planes in reverse order. In the example illustrated in FIG. 4, the first auxiliary image may be generated at focal plane 36G, the second auxiliary image may be generated at focal plane 36F, and so on, until the final auxiliary image is generated at focal plane 36A. In these approaches, controller 20 adjusts the focal distance to a determined value for each focal plane before instructing auxiliary image sensor 18 to generate the auxiliary image at the focal plane, regardless of the focal distance used for the previous primary image. In the illustrated example of FIG. 4, controller 20 adjusts the focal distance seven times to obtain seven auxiliary images at focal planes 36A-36G.

Controller 20 can also obtain the first auxiliary image at the focal distance used for the previous primary image. That is, the first auxiliary image is obtained without adjusting the focal distance used for the previous primary image. In the illustrated example of FIG. 4, controller 20 adjusts the focal distance six times to obtain seven auxiliary images at focal planes 36A-36G. Advantageously, the focal distance adjustment for the first auxiliary image is eliminated, thereby accelerating the autofocus operation. Thus, the first auxiliary image can be generated at any focal plane. Thereafter, controller 20 can sequentially step objective lens 12 through the remaining focal planes to obtain the remaining auxiliary images.

For example, if the first auxiliary image is generated at focal plane 36B (anywhere between focal planes 36A and 36C), then controller 20 can unidirectionally decrease the focal distance by a first incremental distance between focal planes 36A and 36C and then by a second incremental distance between focal planes 36C-36G so that objective lens 12 sequentially steps through focal planes 36B, 36A and 36C-36G. That is, the first auxiliary image may be generated at focal plane 36B, the second auxiliary image may be generated at focal plane 36A, the third auxiliary image may be generated at focal plane 36C, and so on, until the final auxiliary image is generated at focal plane 36G. In one embodiment, controller 20 may unidirectionally decrease the focal distance 5 micron increments between focal planes 36A and 36C and then by 10 micron increments between focal planes 36C-36G.

As another example, if the first auxiliary image is generated at focal plane 36B (anywhere between focal planes 36A and 36C), then controller 20 can unidirectionally increase the focal distance by a first increment (e.g., 5 micron increments) between focal planes 36G-36C and then by a second increment (e.g., 10 micron increments) between focal planes 36C and 36A so that objective lens 12 sequentially steps through focal planes 36B, 36G-36C and 36A. That is, the first auxiliary image may be generated at focal plane 36B, the second auxiliary image may be generated at focal plane 36G, the third auxiliary image may be generated at focal plane 36F, and so on, until the final auxiliary image is generated at focal plane 36A.

Figure 5A:
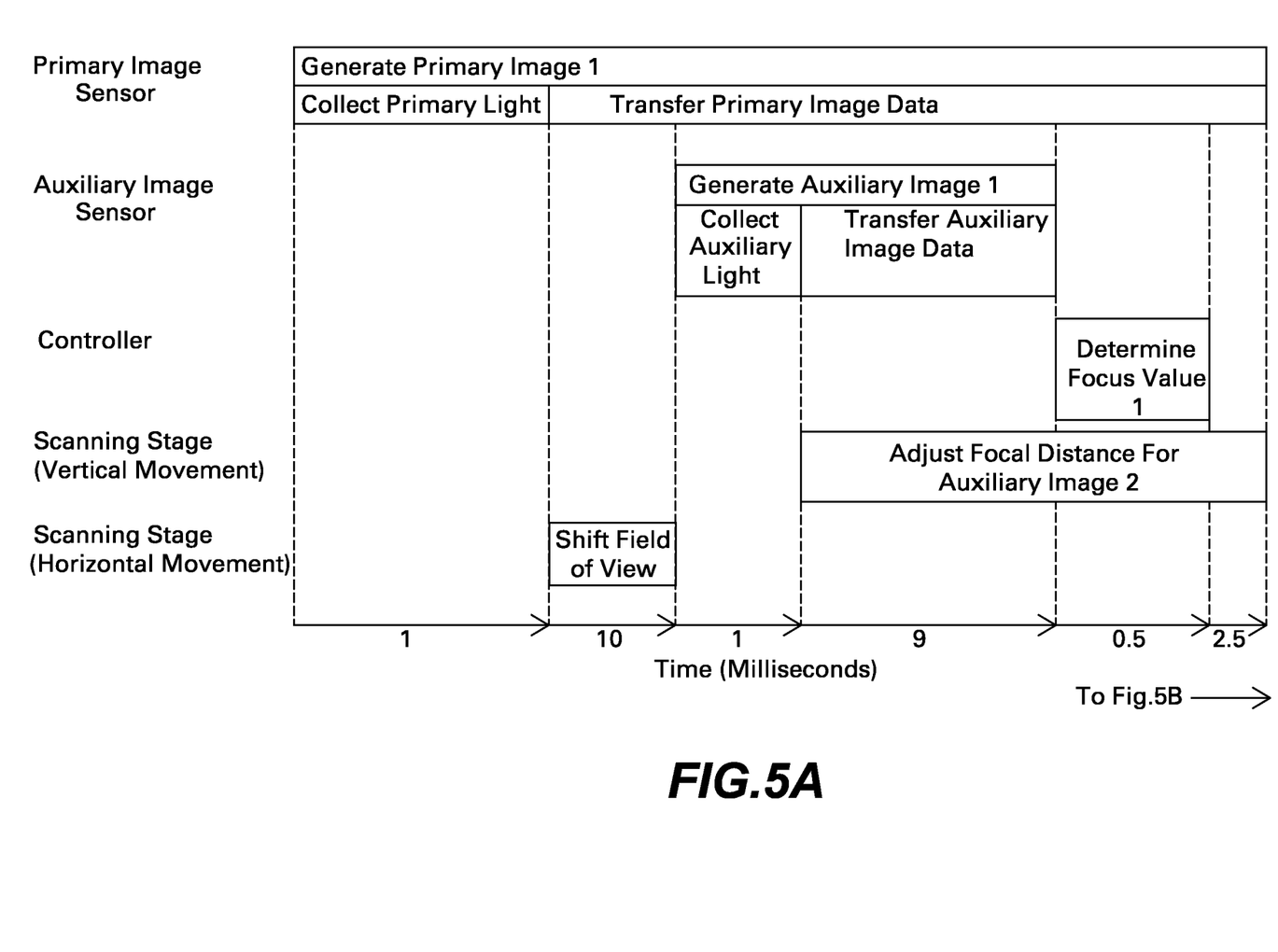
FIGS. 5A-5B show an example time line for performing autofocusing using multiple auxiliary images and simultaneous operations.
Figure 5B:
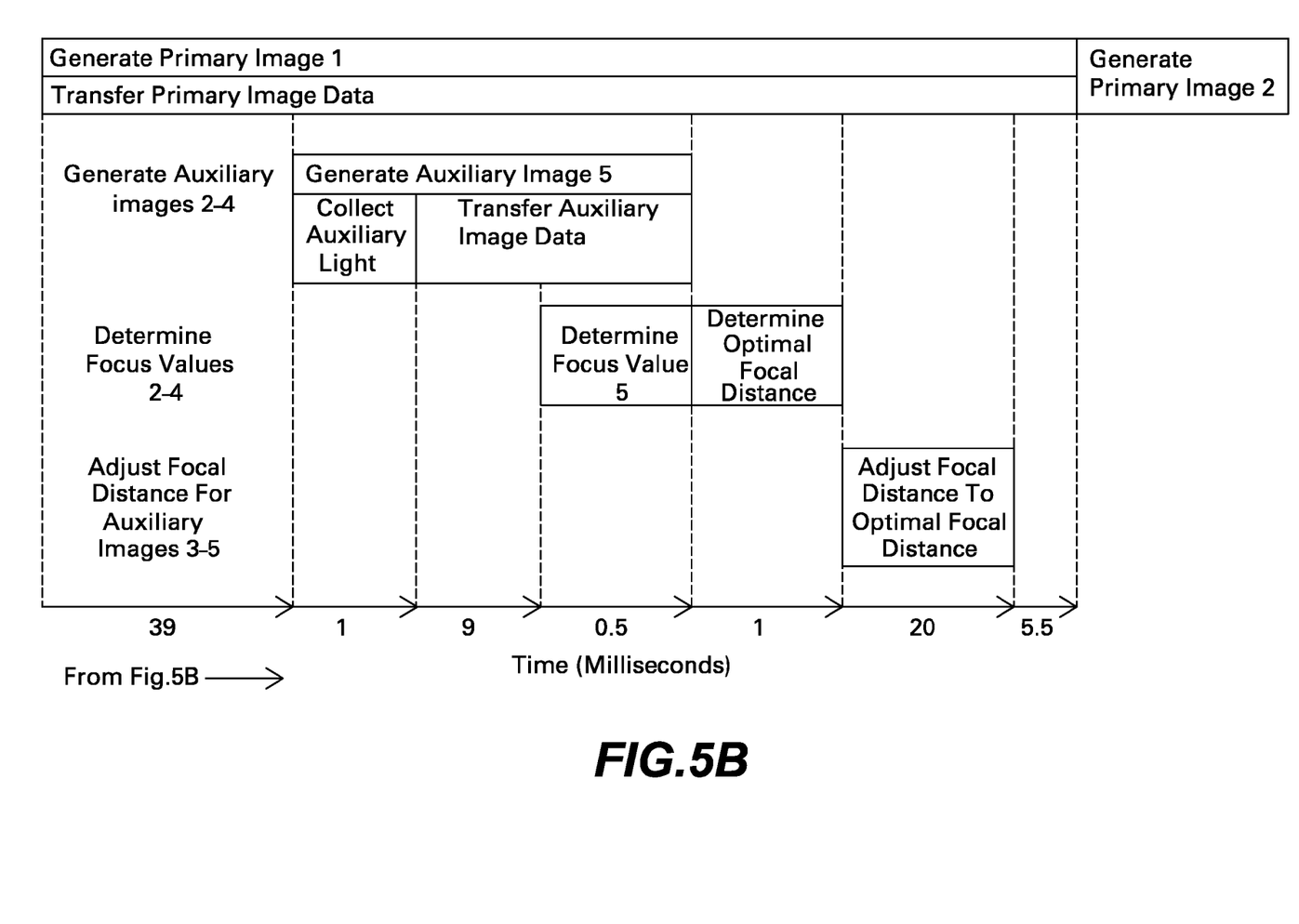

FIGS. 5A and 5B shows an example time line for performing autofocusing using multiple auxiliary images and simultaneous operations. Although FIGS. 5A and 5B and the following description refer to specific time increments, such timing is intended to be for illustrative purposes only. It should be appreciated that the speed at which digital optical microscope 10 and its components operate may scale with technology and therefore any specific details should not be interpreted as limiting.

Referring now to FIGS. 5A-5B, primary image sensor 16 may generate the first primary image in 100 milliseconds. In particular, primary image sensor 16 may collect primary light from primary light path 32 for 1 millisecond and then transfer primary image data based on the collected primary light to controller 20 for 99 milliseconds. As a result, primary image sensor 16 would have a frame rate of 10 frames/second. In one embodiment, primary image sensor 16 collects the primary light while the field of view is at the first region of sample 24.

Scanning stage 22 may laterally shift sample 24 relative to objective lens 12 to move the field of view from the first region of sample 24 to the second region of sample 24 in 10 milliseconds. Scanning stage 22 may begin the lateral shift just as primary image sensor 16 completes collecting the primary light and begins to transfer the primary image data to controller 20.

Thereafter, auxiliary image sensor 18 may generate the first auxiliary image in 10 milliseconds. In particular, auxiliary image sensor 18 may collect auxiliary light from auxiliary light path 34 for 1 millisecond and then transfer auxiliary image data based on the collected auxiliary light to controller 20 for 9 milliseconds. As a result, auxiliary image sensor 18 would have a frame rate of 100 frames/second. In one embodiment, auxiliary image sensor 18 begins collecting the auxiliary light just as the field of view reaches the second region of sample 24.

Scanning stage 22 may adjust the focal distance for the second auxiliary image in 12 milliseconds. Thus, scanning stage 22 adjusts the focal distance from the first focal distance for the first primary and auxiliary images to the second focal distance for the second auxiliary image. Scanning stage 22 may begin adjusting the focal distance just as auxiliary image sensor 18 completes collecting the auxiliary light and begins to transfer the auxiliary image data to controller 20. Furthermore, scanning stage 22 may complete adjusting the focal distance after auxiliary image sensor 18 completes transferring the auxiliary image data to controller 20.

Controller 20 may determine the first focus value for a quantitative characteristic for the first auxiliary image in 0.5 milliseconds. Controller 20 may begin determining the first focus value just as auxiliary image sensor 18 completes transferring the auxiliary image data to controller 20. Furthermore, scanning stage 22 may complete adjusting the focal distance 2.5 milliseconds (12−9−0.5 milliseconds) after controller 20 determines the first focus value.

Thus, auxiliary image sensor 18 may transfer the auxiliary image data for the first auxiliary image to controller 20 simultaneously with and faster than scanning stage 22 adjusts the focal distance for the second auxiliary image. Likewise, controller 20 may determine the first focus value for the first auxiliary image simultaneously with and faster than scanning stage 22 adjusts the focal distance for the second auxiliary image. As a result, there is no delay incurred with transferring the auxiliary image data and determining the focus value for the first auxiliary image.

Thereafter, auxiliary image sensor 18 may generate the second, third and fourth auxiliary images, controller 20 may determine the second, third and fourth focus values, and scanning stage 22 may adjust the focal distance to the third, fourth and fifth focal distances for the third, fourth and fifth auxiliary images in similar fashion. These operations may take 39 milliseconds (3(1+12) milliseconds).

Thereafter, auxiliary image sensor 18 may generate the fifth auxiliary image in 10 milliseconds as it collects auxiliary light from auxiliary light path 34 for 1 millisecond and then transfers auxiliary image data based on the collected auxiliary light to controller 20 for 9 milliseconds. Thereafter, controller 20 may determine the fifth focus value in 0.5 milliseconds and then determine the optimal focal distance based on the first to fifth focus values in 1 millisecond.

Thereafter, scanning stage 22 may adjust the focal distance from the fifth focal distance to the optimal focal distance in 20 milliseconds (assuming worst case focal distance adjustment), thereby autofocusing the second primary image at the second region on sample 24. Moreover, scanning stage 22 may adjust the focal distance to the optimal focal distance for the second primary image before primary image sensor 16 completes transferring the primary image data for the first primary image to controller 20.

Thereafter, primary image sensor 16 may begin generating the second primary image just as primary image sensor 16 completes generating the first primary image. As a result, primary image sensor 16 may take back-to-back snapshots of sample 24 at the first and second regions without incurring delay between the snapshots.

The first primary image may be generated in 100 milliseconds. Furthermore, 1 millisecond after the first primary image begins to be generated, the field of view may be laterally shifted from the first to second region in 10 milliseconds. The five auxiliary images may then be generated and the optimal focal distance determined in 63.5 milliseconds (13+39+10+ 0.5+1 milliseconds), and then the focal distance adjusted to the optimal focal distance in 20 milliseconds. Thus, the second primary image may be autofocused and ready to begin 5.5 milliseconds (100−(1+10+63.5+20) milliseconds) before completing generation of the first primary image. Moreover, although the autofocusing operation may use 1.5 milliseconds to determine the final focus value and the optimal focal distance, the autofocusing operation may be delayed by less than 2 percent due to the focus algorithm since the other focus values are determined in parallel with and faster than adjusting the focal distance for the upcoming auxiliary images. Likewise, generating the auxiliary images before the final auxiliary image causes negligible delays since these auxiliary images transfer the auxiliary image data in parallel with and faster than adjusting the focal distance for the upcoming auxiliary images.

Microscope 10 may contain additional optical, electronic and mechanical elements, such as lenses, apertures, beam splitters, circuits, image processors, software routines, data and control buses, stepper motors, piezoelectric actuators and the like. These elements have been omitted for convenience of illustration.

Microscope 10 may contain separate objective lenses for the primary image sensor and the auxiliary image sensor, thereby obviating the need for the beam splitter, and adjust the focal distance for the objective lenses in tandem.

Microscope 10 may generate various numbers of auxiliary images during the autofocusing operation. For instance, microscope 10 can generate three auxiliary images, with the first auxiliary image generated at the optimal focal distance of the previous primary image, the second auxiliary image generated at a longer focal distance and the third auxiliary image generated at a shorter focal distance. Further, microscope 10 may vertically shift the objective lens relative to the sample continuously or intermittently during the autofocusing operation.

Various changes and modifications to the embodiments described herein are contemplated. For instance, the materials, dimensions and shapes described above are merely exemplary. Such changes and modifications may be made without departing from the spirit and scope of the present invention as defined in the appended claims.

What is claimed is:

1. A digital optical microscope, comprising:
a primary image sensor that sequentially generates a first and a second primary image of a sample at a primary frame rate;
an auxiliary image sensor that sequentially generates a first, a second and a third auxiliary image of the sample at an auxiliary frame rate that is faster than the primary frame rate; and
a controller that adjusts a focal distance between an objective lens and the sample along an optical axis to a first focal distance to obtain the first primary and auxiliary images, then to a second focal distance to obtain the second auxiliary image, then to a third focal distance to obtain the third auxiliary image, and then to a selected focal distance based on the first, second and third auxiliary images to obtain the second primary image, thereby autofocusing the primary image on the sample, wherein the primary image sensor generates the primary image in response to the autofocusing.

2. The microscope of claim 1, wherein the primary image sensor is a camera and the auxiliary image sensor is a camera.

3. The microscope of claim 1, wherein the primary image comprises more pixels than the auxiliary image.

4. The microscope of claim 3, wherein the primary image has a primary resolution at a field of view, the auxiliary image has an auxiliary resolution at the field of view, and the primary resolution is higher than the auxiliary resolution.

5. The microscope of claim 3, wherein the primary image has a primary resolution at a field of view, the auxiliary image has an auxiliary resolution at a region or regions of interest within the field of view, and the primary resolution is the same as the auxiliary resolution.

6. The microscope of claim 1, wherein the primary image comprises at least three times as many pixels as the auxiliary image, and the auxiliary frame rate is at least three times as fast as the primary frame rate.

7. The microscope of claim 1, wherein the controller determines a quantitative characteristic based on a sharpness of the auxiliary image, determines the selected focal distance based on the quantitative characteristic, and adjusts the focal distance to the selected focal distance to autofocus the primary image on the sample.

8. The microscope of claim 1, wherein the controller determines a quantitative characteristic for each auxiliary image to obtain multiple focus values of the quantitative characteristic, determines the selected focal distance based on the multiple focus values, and adjusts the focal distance to the selected focal distance to autofocus the primary image on the sample.

9. The microscope of claim 1, wherein the controller determines a first focus value of a quantitative characteristic for the first auxiliary image and a second focus value of the quantitative characteristic for the second auxiliary image, determines the first focus value while adjusting the focal distance between the first and second focal distances, determines the selected focal distance based on the first and second focus values, and adjusts the focal distance to the selected focal distance to autofocus the primary image on the sample.

10. A digital optical microscope, comprising:
an objective lens;
a beam splitter that splits light that is collected from a sample and passes through the objective lens into a primary light path and an auxiliary light path;
a primary image sensor that generates a first and a second primary image of the sample with a primary pixel count at a primary frame rate using the primary light path without using the auxiliary light path;
an auxiliary image sensor that generates a first, a second and a third auxiliary image of the sample with an auxiliary pixel count at an auxiliary frame rate using the auxiliary light path without using the primary light path; and
a controller that adjusts a focal distance between the objective lens and the sample along an optical axis to a first focal distance to obtain the first primary and first auxiliary images, then to a second focal distance to obtain the second auxiliary image, then to a third focal distance to obtain the third auxiliary image, and then to a selected focal distance based on the first, second and third auxiliary images to obtain the second primary image, thereby autofocusing the second primary image on the sample, wherein the auxiliary frame rate is faster than the primary frame rate.

11. The microscope of claim 10, wherein the objective lens has a numerical aperture of at least 0.5.

12. The microscope of claim 10, wherein the primary image sensor is a camera and the auxiliary image sensor is a camera.

13. The microscope of claim 10, wherein the primary image has a primary resolution at a field of view, the auxiliary image has an auxiliary resolution at the field of view, and the primary resolution is higher than the auxiliary resolution.

14. The microscope of claim 10, wherein the primary image has a primary resolution at a field of view, the auxiliary image has an auxiliary resolution at a region or regions of interest within the field of view, and the primary resolution is the same as the auxiliary resolution.

15. The microscope of claim 10, wherein the primary image comprises at least three times as many pixels as the auxiliary image, and the auxiliary frame rate is at least three times as fast as the primary frame rate.

16. The microscope of claim 10, wherein the controller determines a quantitative characteristic based on a sharpness of the auxiliary image, determines a selected focal distance based on the quantitative characteristic, and adjusts the focal distance to the selected focal distance to autofocus the primary image on the sample.

17. The microscope of claim 10, wherein the first, second and third auxiliary images are obtained at successive focal distances, and wherein the controller determines a quantitative characteristic for each auxiliary image to obtain multiple focus values of the quantitative characteristic, determines the selected focal distance based on the multiple focus values, and adjusts the focal distance to the selected focal distance to autofocus the primary image on the sample.

18. The microscope of claim 10, wherein the controller:
adjusts the focal distance to sequentially obtain the first auxiliary image at the first focal distance and the second auxiliary image at the second focal distance,
determines a first focus value of a quantitative characteristic for the first auxiliary image and a second focus value of the quantitative characteristic for the second auxiliary image, determines the first focus value while adjusting the focal distance between the first and second focal distances, determines the selected focal distance based on the first and second focus values, and adjusts the focal distance to the selected focal distance to autofocus the primary image on the sample.

19. The digital optical microscope of claim 10, wherein the auxiliary pixel count is lower than the primary pixel count.

20. A digital optical microscope, comprising:
an objective lens with a field of view;
a beam splitter that splits light that is collected from a sample at the field of view and passes through the objective lens into a primary light path and an auxiliary light path;
a primary image sensor that generates first and second primary images of the sample using the primary light path without using the auxiliary light path, wherein the primary images each have a primary pixel count and are generated at a primary frame rate, the first primary image represents a first region of the sample at the field of view, the second primary image represents a second region of the sample at the field of view, and the regions are laterally offset;
an auxiliary image sensor that generates first, second and third auxiliary images of the sample using the auxiliary light path without using the primary light path, wherein the auxiliary images are generated while the field of view is at the second region and the auxiliary images each have an auxiliary pixel count and are generated at an auxiliary frame rate; and
a controller that adjusts a lateral position between the objective lens and the sample to move the field of view from the first region to the second region and adjusts a focal distance between the objective lens and the sample along an optical axis to a selected focal distance using the auxiliary images without using the primary images, thereby autofocusing the second primary image on the sample using the auxiliary image sensor without using the primary image sensor, wherein the primary image sensor generates the first primary image while the controller moves the field of view from the first region to the second region, while the auxiliary image sensor generates the auxiliary images and while the controller adjusts the focal distance to the selected focal distance, the primary image sensor generates the second primary image in response to the autofocusing, the auxiliary pixel count is lower than the primary pixel count and the auxiliary frame rate is faster than the primary frame rate.

21. The microscope of claim 20, wherein the primary image sensor is a camera and the auxiliary image sensor is a camera.

22. The microscope of claim 20, wherein the primary images have a primary resolution at the field of view, the auxiliary images have an auxiliary resolution image at the field of view, and the primary resolution is higher than the auxiliary resolution.

23. The microscope of claim 20, wherein the primary images have a primary resolution at the field of view, the auxiliary images have an auxiliary resolution at a region or regions of interest within the field of view, and the primary resolution is the same as the auxiliary resolution.

24. The microscope of claim 20, wherein each primary image comprises at least three times as many pixels as each auxiliary image, and the auxiliary frame rate is at least three times as fast as the primary frame rate.

25. The microscope of claim 20, wherein the controller adjusts the focal distance to sequentially obtain the first auxiliary image at a first focal distance, the second auxiliary image at a second focal distance and the third auxiliary image at a third focal distance, determines a first focus value of a quantitative characteristic for the first auxiliary image, a second focus value of the quantitative characteristic for the second auxiliary image and a third focus value of the quantitative characteristic for the third auxiliary image, and determines the selected focal distance based on the first, second and third focus values.

26. The microscope of claim 20, wherein the primary image sensor generates the first primary image by collecting first primary light from the primary light path and then transferring first primary image data based on the first primary light to the controller, and the controller moves the field of view from the first region to the second region, the auxiliary image sensor generates the auxiliary images and the controller adjusts the focal distance to the selected focal distance after the primary image sensor collects the first primary light and before the primary image sensor completes transferring the first primary image data to the controller.

27. The microscope of claim 26, wherein the auxiliary image sensor generates the first auxiliary image by collecting first auxiliary light from the auxiliary light path and then transferring first auxiliary image data based on the first auxiliary light to the controller, the controller adjusts the focal distance to sequentially obtain the first auxiliary image at a first focal distance, the second auxiliary image at a second focal distance and the third auxiliary image at a third focal distance, the controller begins adjusting the focal distance from the first focal distance to the second focal distance after the auxiliary image sensor collects the first auxiliary light and before the auxiliary image sensor completes transferring the first auxiliary image data to the controller, and the controller completes adjusting the focal distance from the first focal distance to the second focal distance after the auxiliary image sensor completes transferring the first auxiliary image data to the controller.

28. The microscope of claim 27, wherein the controller determines a first focus value of a quantitative characteristic for the first auxiliary image, a second focus value of the quantitative characteristic for the second auxiliary image and a third focus value of the quantitative characteristic for the third auxiliary image, determines the selected focal distance based on the first, second and third focus values, begins adjusting the focal distance from the first focal distance to the second focal distance before the controller begins determining the first focus value, and completes adjusting the focal distance from the first focal distance to the second focal distance after the controller completes determining the first focus value.

29. The microscope of claim 27, wherein the controller maintains the focal distance at the first focal distance while the primary image sensor collects the first primary light, while the controller moves the field of view from the first region to the second region and while the auxiliary image sensor collects the first auxiliary light.

\* \* \* \* \*